May 8, 1956          M. CHAIKEN ET AL          2,744,326
REPLACEABLE ENAMEL FACING FOR CROWNS AND METHOD OF MAKING SAME
Filed June 18, 1954                                3 Sheets-Sheet 1
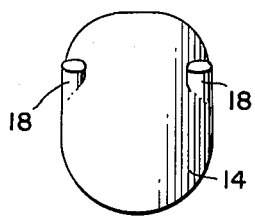
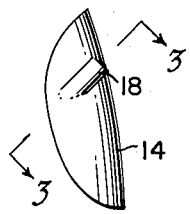
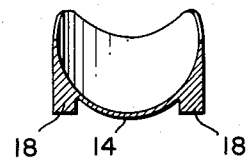
Fig. 1.      Fig. 2.      Fig. 3.
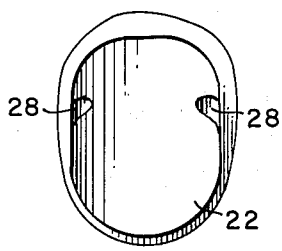
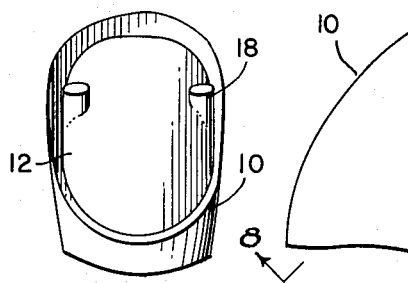
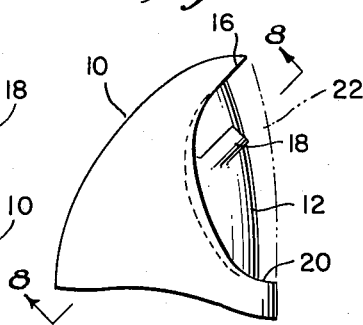
Fig. 4.      Fig. 5.      Fig. 6.
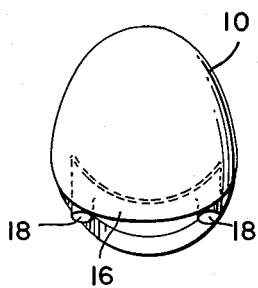
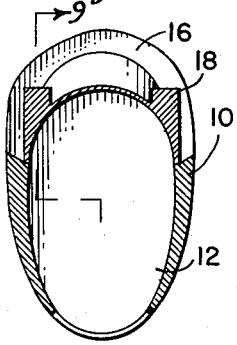
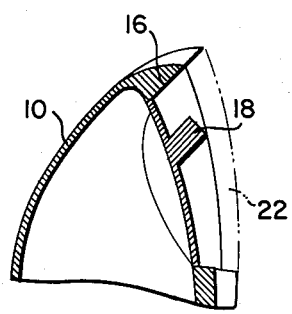
Fig. 7.      Fig. 8.      Fig. 9.
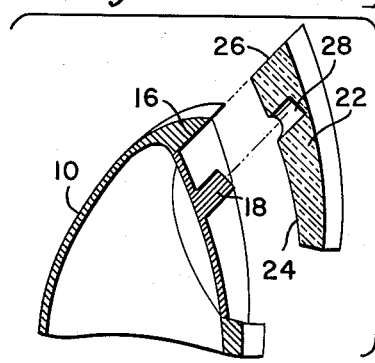
Fig. 10.
INVENTORS
MORRIS CHAIKEN
JACK M. WEINSTEIN
BY
*Caesar and Rivise*
ATTORNEYS.

May 8, 1956 M. CHAIKEN ET AL 2,744,326
REPLACEABLE ENAMEL FACING FOR CROWNS AND METHOD OF MAKING SAME
Filed June 18, 1954 3 Sheets-Sheet 2

INVENTORS.
MORRIS CHAIKEN
JACK M. WEINSTEIN
BY
*Caesar and Rivise*
ATTORNEYS.

May 8, 1956 M. CHAIKEN ET AL 2,744,326
REPLACEABLE ENAMEL FACING FOR CROWNS AND METHOD OF MAKING SAME
Filed June 18, 1954 3 Sheets-Sheet 3

INVENTORS.
MORRIS CHAIKEN
BY JACK M. WEINSTEIN
*Caesar and Rivise*
ATTORNEYS.

United States Patent Office 2,744,326
Patented May 8, 1956

2,744,326
REPLACEABLE ENAMEL FACING FOR CROWNS AND METHOD OF MAKING SAME

Morris Chaiken and Jack M. Weinstein, Philadelphia, Pa.

Application June 18, 1954, Serial No. 437,781

7 Claims. (Cl. 32—12)

This invention relates to a non-porous, non-plastic interchangeable veneer facing for crowns and a method of making the crown to receive the veneer.

Heretofore, acrylic or other plastics have been employed to make facings for crowns. The disadvantages of such facings are that it is difficult to get proper shade matchings, the acrylic is porous, absorbs saliva and thereby causes denture odor and discoloration.

The primary object of the present invention is to provide a crown with a replaceable facing of porcelain or equivalent non-porous, non-plastic material which will overcome the disadvantages noted hereinabove with respect to the conventional plastic facings.

Another object of the invention is to provide a crown with a built-in backing plate, a porcelain facing and a means to secure the facing to the backing in such a manner that, in the event of damage to the facing, the same can be readily removed and replaced with another porcelain facing of the same shade and dimensions.

A further object of the invention is to provide a crown with a backing plate and a replaceable porcelain facing, both of which can be readily prefabricated into standard sizes to effect an economy in the repair and reconstitution of a damaged crown.

A further object of the invention is to provide a crown having a built-in backing plate, a porcelain facing and various novel means for securely but removably attaching the facing to the backing plate whereby the facing may be readily and easily replaced when necessary.

An important feature of the invention is to provide a crown with a replaceable porcelain facing wherein the facing is protected against chipping due to chewing. This is effected by providing the crown with a lateral, upwardly inclined lip and by providing the porcelain facing with an upper beveled edge inclined in the opposite direction but parallel to the lip of the crown. When the porcelain facing is secured to the backing plate of the crown, the upper beveled edge thereof contacts the lateral lip of the crown and the angle of inclination and size of the lip is such that it becomes the biting surface of the tooth while, at the same time, very little if any of the lateral lip will be displayed when the facing is viewed laterally in the mouth.

Another feature of the invention is to provide a crown having a built-in backing plate and an upwardly inclined lip overhanging the backing plate, a replaceable porcelain facing having an upper beveled edge which is downwardly inclined but parallel to the lip of the crown and adapted to engage said lip with means to securely but removably attach the facing plate to the backing plate. The preferred attaching means comprises a pair of spaced parallel protuberances extending from the backing plate adjacent and parallel to the lip of the crown and a pair of spaced parallel sockets opening through the inner surface of the facing which are inclined in the opposite direction but are parallel to the protuberances of the backing plate and are adapted to receive said protuberances. The protuberances are preferably small and located adjacent the sides of the backing plate near the crown and the sockets are also preferably small and located adjacent the sides and the upper beveled edge of the facing. Thus, the sockets are provided in the thickest portion of the porcelain facing providing maximum support and utility of a maximum amount of porcelain without sacrificing any shading in the porcelain facing.

Another important object of the invention is to provide a process for inexpensively making a crown adapted to receive a replaceable porcelain facing.

These and other objects and features of the invention will become more apparent as the following description proceeds in conjunction with the accompanying drawings wherein:

Figure 1 is a front elevational view of the outer face of the backing plate;

Figure 2 is a side elevational view of the backing plate of Figure 1;

Figure 3 is a sectional view taken on the line 3—3 of Figure 2;

Figure 4 is a front elevational view of the inner surface of the facing;

Figure 5 is a front elevational view of the outer surface of the crown with the backing plate in place;

Figure 6 is a side elevational view of the crown and backing plate shown in Figure 5, the facing being illustrated in phantom lines;

Figure 7 is a top plan view of the crown and backing plate of Figure 5;

Figure 8 is a sectional view taken on the line 8—8 of Figure 6;

Figure 9 is a sectional view taken on the line 9—9 of Figure 8;

Figure 10 is a fragmentary exploded sectional view illustrating the manner in which the facing is secured to the backing plate on the crown;

Specific reference will now be made to the drawings wherein similar reference characters are used for corresponding elements throughout.

Figure 11:
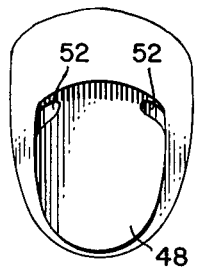
Figure 11 is a front elevational view of the inner surface of a facing in a second form of the invention.

Referring first to the form of the invention shown in

Figures 1–10, the same comprises a full gold crown 10 molded in accordance with the impression taken by the dentist. Molded with or otherwise secured to the crown at a predetermined position is a metallic or gold backing plate 12 which includes an outer curved surface 14. The upper edge of the crown includes an upwardly inclined lip 16 which overhangs the backing plate 12 so that the latter is in effect recessed, as shown clearly in Figures 6, 9 and 10. Extending from the outer surface of the backing plate adjacent the longitudinal sides thereof and adjacent the lip 16 of the crown is a pair of relatively short protuberances or prongs 18 which are parallel to each other, are inclined in the same direction as the lip 16 and also parallel to said lip. The crown also includes a slightly recessed ledge 20 extending peripherally around the backing plate.

The facing 22 is made of porcelain or any equivalent non-porous, non-plastic material. The inner surface 24 thereof conforms to the curvature of the backing plate and is thicker at the top than it is at the bottom. The upper edge 26 of the facing is beveled, is of the same depth as that of the lip 16 of the crown and is inclined in an opposite direction but parallel to the lip of the crown. In the thicker portion of the porcelain facing adjacent its longitudinal sides and adjacent its upper beveled edge is provided a pair of sockets 28 opening through the inner surface thereof. The sockets are of dimensions sufficient to receive the protuberances or prongs 18 of the backing plate, are inclined in the same direction as the beveled edge 26, are parallel to each other and are also parallel to the protuberances or the prongs 18, as shown clearly in Figure 10.

Thus, after cement is placed on the surface 14 of the backing plate, the porcelain facing 22 is fitted into the backing plate in such a manner that the protuberances or prongs 18 engage in the open sockets 28 of the facing. In the final position of the crown, the inner surface 24 of the facing bears tightly against the outer surface 14 of the backing plate, the peripheral edge of the facing is engaged in the peripheral ledge 20 of the crown and the upper beveled edge 26 which is coextensive with the lip 16 of the crown bears against said lip. The inclination and depth of the lip 16 of the crown is such that it becomes the biting surface of the tooth thereby protecting the porcelain facing from chipping upon chewing. Moreover, the inclination and depth of the lip of the crown 16 and its relationship to the upper beveled edge 26 of the facing is such that very little, if any, of said lip is displayed when the facing is viewed laterally in the mouth.

It will thus be seen that if the porcelain facing should become damaged, it can be readily removed and replaced with another standard porcelain facing of the same size, shape and dimensions. The replacement is easily effected because of the parallel relationships of the prongs or protuberances 18 of the backing, the overhanging lip 16 of the crown and the sockets 28 already provided in the inner surface of the standard porcelain facing to be used as a replacement.

Other means may be used to removably and replaceably attach the porcelain facing to the backing plate of the crown employing the same basic principle as that heretofore described, which means are shown in the modification of Figures 11–19.

Figure 12:
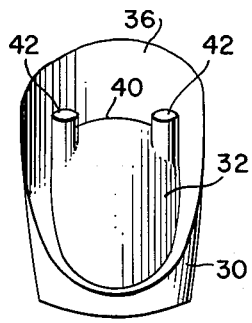
Figure 12 is a front elevational view of the outer surface of the crown with the backing plate in place in the second form of the invention.
Figure 13:
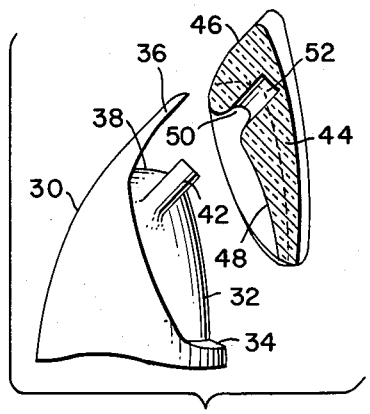
Figure 13 is a fragmentary exploded view, parts being shown in section, illustrating the manner in which the facing is secured to the backing plate of the crown in the second form of the invention.

In the modification of Figures 11–13, the crown 30 is molded with a curved recessed backing plate 32 and includes a ledge 34 peripherally around the backing plate and a lip 36 which overhangs the backing plate and is inclined at a predetermined upward angle. The backing plate is indented from one longitudinal side thereof to the other as at 38 to provide an upwardly extending shelf 40 which is inclined in the same direction as the lip 36 of the crown and extends parallel thereto. At predetermined locations in the shelf 40 a pair of relatively small protuberances 42 are provided which extend outwardly from the backing plate at the same inclination as the lip 36 of the crown which are parallel to each other and which are also parallel to the lip of the crown.

The porcelain facing 44, which is thicker at the top than it is at the bottom includes an upper beveled edge 46 which is coextensive with the lip 36 of the crown, which is inclined in the opposite direction but is parallel to said lip. Opening through the inner surface 48 of the facing is a groove 50 which is coextensive with the shelf 40 of the backing plate, is inclined opposite and parallel thereto. Opening through the groove 50 at predetermined locations are sockets 52 which are parallel to each other, inclined in the opposite direction but parallel to the protuberances or prongs 42 of the backing plate.

Thus, after cement is applied to the backing plate, the facing is fitted into the backing plate so that the upper beveled edge 46 engages the lip 36 of the crown, the sockets 52 receive the protuberances 42 and the groove 50 the shelf 40, in a manner which will be obvious to a skilled artisan. The shelf 40 of the backing plate engaged in the groove 50 of the facing adds additional security to the facing and also permits the use of shorter protuberances or prongs 42.

Figure 14:
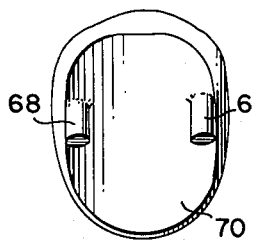
Figure 14 is a front elevational view of the inner surface of a facing in a third form of the invention.
Figure 15:
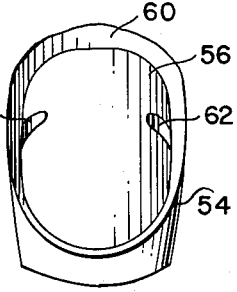
Figure 15 is a front elevational view of the outer surface of the crown with the backing plate in place in the third form of the invention.
Figure 16:
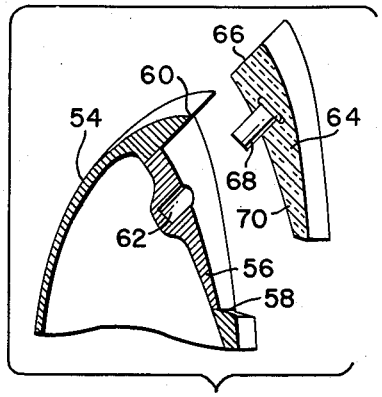
Figure 16 is a fragmentary exploded sectional view of the third form of the invention showing the manner in which the facing is secured to the backing plate of the crown.

In the modification shown in Figures 14–16, the crown 54 is molded with a recessed backing plate 56 and includes a ledge 58 peripherally around the backing plate and a lip 60 overhanging the backing plate at a predetermined upward angle. Adjacent the longitudinal sides of the backing plate and adjacent the lip 60, the backing plate is provided with sockets 62 which open through the outer curved surface thereof which are inclined in the same direction as the lip 60 and which are also parallel thereto and to each other.

The porcelain facing 64 is thicker on top than it is at the bottom and includes an upper beveled edge 66 which is coextensive with the lip 60 of the crown, which is inclined in the opposite direction but is parallel thereto. Adjacent the upper edge of the facing 64, the same is provided with protuberances or prongs 68 which extend through the inner surface 70 thereof. The prongs 68 are parallel to each other and are inclined oppositely but are parallel to the sockets 62 in the backing plate.

Thus, after cement is applied to the backing plate, the facing is fitted into the backing plate so that the upper beveled edge 66 thereof engages the lip 60 of the crown, the prongs 68 engage in the sockets 62 and the inner surface of the facing presses tightly against the outer curved surface of the backing plate with the peripheral edge of the facing engaged in the peripheral ledge 58 of the crown in a manner which will be obvious to a skilled artisan.

Figure 17:
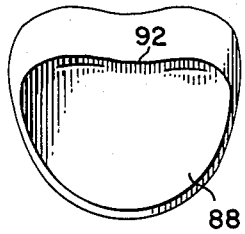
Figure 17 is a front elevational view of the inner surface of the facing of a fourth form of the invention.
Figure 18:
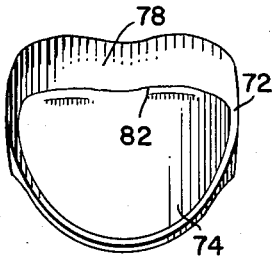
Figure 18 is a front elevational view of the outer surface of the crown with the backing plate in place in the fourth form of the invention.
Figure 19:
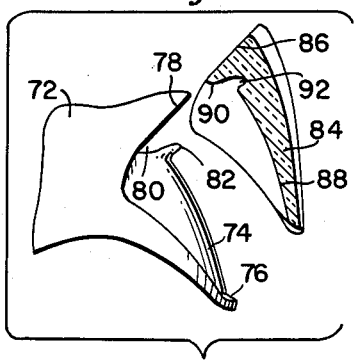
Figure 19 is a fragmentary exploded view, parts being shown in section, illustrating the manner in which the facing is secured to the backing plate in the crown in the fourth form of the invention.

In the modification shown in Figures 17–19 the crown 72 is molded with a recessed backing plate and includes a ledge 76 peripherally around the backing plate and a lip 78 overhanging the backing plate at a predetermined upward angle. The backing plate is provided at its upper edge with a shelf 80 extending from one longitudinal side thereof to the other immediately beneath the lip 78 of the crown. The shelf 80 includes a portion 82 which extends at the same inclination as the lip 78 and is parallel thereto.

The porcelain facing 84 which is thicker at the top than it is at the bottom includes an upper beveled edge 86 which is coextensive with the lip 78 of the crown and extends oppositely but is parallel to said lip. Adjacent the upper beveled edge 86 of the facing, the inner surface 88 thereof is provided with a portion 90 adapted to be engaged in the shelf 80 of the backing plate and a groove 92 coextensive with the portion 82 of the shelf of the backing plate. Said groove 92 extends in the direction parallel to the portion 82 of the shelf 80 of the backing plate.

Thus, after cement is applied to the backing plate, the facing is fitted into the backing plate so that the upper beveled edge 86 engages the lip 78 of the crown, the portion 90 of the facing engages in the shelf 80 of the backing plate and the portion 92 of the facing engages the portion 82 of the shelf of the backing plate with the inner surface 88 of the facing pressing firmly against the outer curved surface of the backing plate and the peripheral edge of the facing engaging the peripheral ledge 76 of the crown.

Figure 20:
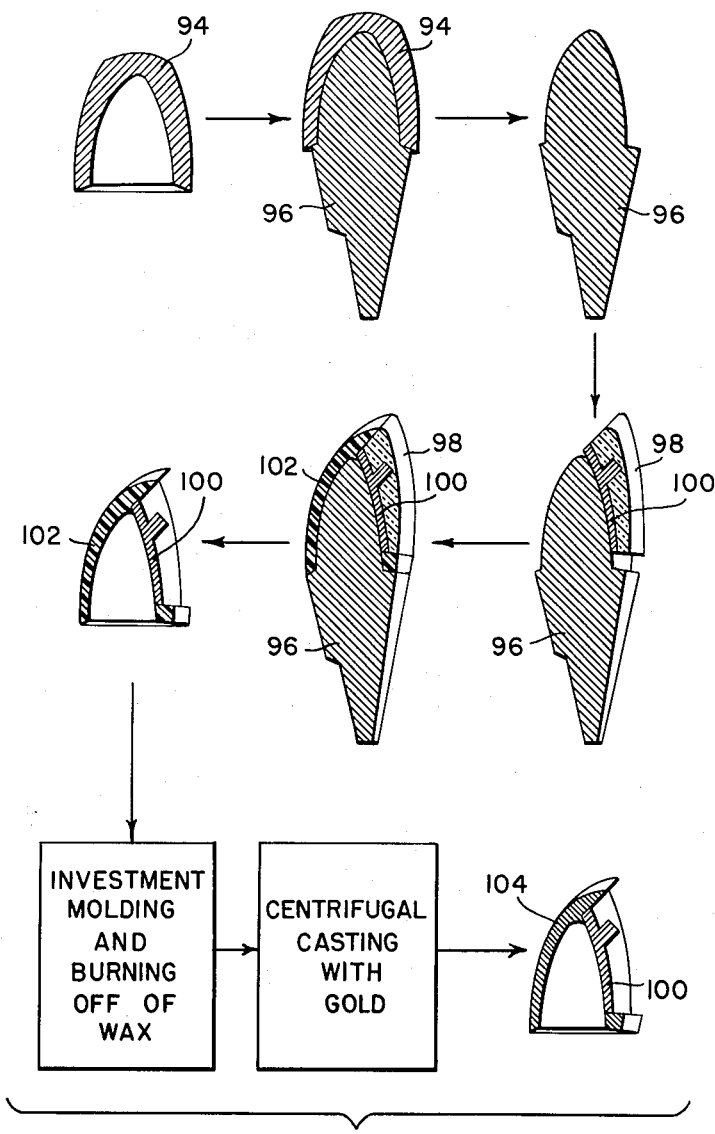
Figure 20 is a diagrammatic view, some parts being shown in section, illustrating the sequence of stages in the process of making the crown and replaceable facing of the invention.

The process of making the crown for receiving the removable and replaceable porcelain facing is shown in Figure 20. Although the process as illustrated in Figure 20 shows the use of the form of the invention shown in Figures 1–10, it will be understood that the same process may be employed in connection with all modifications of the invention, as shown and described hereabove.

After the dentist has made an impression of the crown as at 94, the same is used in a conventional manner to make a die of the tooth as at 96. The die is then placed in an articulator (not shown) and the proper size and shade of facing 98 is selected. This is a facing, such as previously described, which includes an upper beveled edge and spaced parallel sockets opening through the inner surface thereof. After the facing has been placed against the die and ground to the proper size and length, a backing plate 100 is selected. This backing plate already includes the spaced prongs or protuberances adapted to engage in the sockets of the facing.

The backing plate is fitted into the facing, adjusted to its proper position and with the facing is positioned upon the die 96 of the tooth. Thereafter, the backing and facing are waxed as at 102 so that the wax extends up to the outer edge of the beveled portion of the facing.

The facing is then removed and the wax mold with the backing in position in the wax is invested. The wax is then eliminated in a conventional manner by heating and the crown is finally cast in gold, preferably in a centrifugal casting machine to yield the gold crown 104 with the backing 100 properly in position.

The cast crown is then fitted on the die of the tooth and the roughness in the casting is finished. The cast crown and fitted facing are then supplied to the dentist who installs the crown on the tooth and then cements the facing in proper position on the backing plate.

In the event that the facing should accidentally chip or crack, the dentist can readily remove the facing and replace it with a matched standard porcelain facing. A wide variety of prefabricated standard backing plates and facings may be provided to effect economies not only in the original production of the crown and the porcelain facing but also in the replacement of broken facings and the reconstitution of damaged crowns.

While preferred embodiments of the invention have been shown and described hereabove, it will be understood that a skilled artisan may make minor variations without departing from the spirit of the invention and the scope of the appended claims.

We claim:

1. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including at least one prong extending from the backing plate at an upward inclination parallel to that of the lip and a socket extending through the inner surface of the facing at a downward inclination parallel to the prong and receiving the latter.

2. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including a pair of spaced parallel prongs extending from the backing plate adjacent and at an upward inclination parallel to that of the lip and a pair of spaced parallel sockets extending through the inner surface of the facing at a downward inclination parallel to the prongs and receiving the latter.

3. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including a shelf extending from the backing plate adjacent to the lip and including a portion extending at an upward inclination parallel to the lip and a groove coextensive with the shelf opening through the inner surface of the facing and including a portion extending at a downward inclination parallel to the shelf, said groove receiving said shelf.

4. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including a shelf extending from the backing plate adjacent to the lip, at least one prong extending from the backing plate at the shelf and at the same upward inclination as the lip, a groove coextensive with the shelf opening through the inner surface of the facing, and a socket at the groove extending at a downward inclination parallel to the prong, said groove receiving said shelf and said socket receiving said prong.

5. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including a shelf extending from the backing plate adjacent to the lip, a pair of spaced parallel prongs extending from the backing plate at the shelf and at the same upward inclination as the lip, a groove coextensive with the shelf opening through the inner surface of the facing, and a pair of spaced parallel sockets at the groove and extending at a downward inclination parallel to the prongs, said groove receiving said shelf and said sockets receiving said prongs.

6. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including at least one protuberance extending from the inner surface of the facing at a downward inclination parallel to the lip and at least one socket in the backing plate extending at an upward inclination parallel to the lip and receiving said protuberance.

7. In a crown for a tooth, a backing plate molded in a predetermined position with the crown, the biting surface of the crown including a lip overhanging the backing plate at a predetermined upward angle, a porcelain facing having an upper beveled edge of depth and inclination corresponding to those of the lip and means removably and replaceably securing the facing to the backing whereby the upper beveled edge of the facing contacts the lip, said means including cooperating interengaging protuberances and indentations of opposite inclination and extending substantially parallel to the lip.

References Cited in the file of this patent

UNITED STATES PATENTS

| | | |
|---|---|---|
| 1,519,969 | Bechtold | Dec. 16, 1924 |
| 1,803,680 | Schwartz | May 5, 1931 |